United States Patent Office 3,488,399
Patented Jan. 6, 1970

3,488,399
PREPARATION OF OLEFINIC COMPOUNDS AND DERIVATIVES THEREOF
Lars Skattebol, Tarrytown, N.Y., assignor to Union Carbide Corporation, a corporation of New York
No Drawing. Original application Nov. 25, 1964, Ser. No. 413,972, now Patent No. 3,333,012, dated July 25, 1967. Divided and this application Nov. 14, 1966, Ser. No. 593,652
Int. Cl. C07c 11/00, 5/22
U.S. Cl. 260—677               6 Claims

ABSTRACT OF THE DISCLOSURE

Olefinically unsaturated hydrocarbons having from 5 to 12 carbon atoms in a straight chain and having one pair of double bonds in an adjacent position and at least one other double bond no more than four carbon atoms from the said adjacent double bonds, are isomerized by heating in the vapor state at a temperature of from about 150° to about 400° C. The isomerized products are useful as monomers in the preparation of vinyl-type polymers having known utility.

---

This application is a division of copending application Ser. No. 413,972, filed Nov. 25, 1964, now U.S. Patent No. 3,333,012, issued on July 25, 1967.

This invention relates to a novel process for the preparation of olefinic compounds and derivatives thereof. In one aspect, this invention relates to a novel process for the preparation of olefinically unsaturated compounds having a double bond in the terminal position. In another aspect, this invention relates to a novel process for the preparation of olefinically unsaturated compounds by the isomerization of allenes. In a further aspect, this invention relates to a novel process for the preparation of certain derivatives obtained from olefinically unsaturated compounds.

Numerous methods have been reported in the literature for the preparation of olefinically unsaturated compounds. For instance, it is well known that olefins can be prepared by the dehydrohalogenation of halohydrocarbons or the dehydration of alcohols. Moreover, it is also well known that olefinically unsaturated compounds can be prepared by the partial reduction of acetylenic bonds. Each of the aforesaid methods has widespread application in the industrial preparation of olefins and accounts for a sizeable portion of unsaturated compounds currently being produced.

In many instances, however, a particular olefinically unsaturated compound is desired which cannot be prepared conveniently by the aforementioned techniques, or which is obtained in admixture with other isomers and hence, difficult to separate. In such cases, other synthetic routes have been devised. Among the many methods used in the preparation of specific olefins are those involving the rearrangement or reaction of other unsaturated compounds. For example, olefinically unsaturated compounds having the double bond in a desired position can be prepared by the rearrangement or isomerization of other less desirable olefins by the use of certain catalysts. For instance it is known that olefins undergo an exchange or displacement reaction with trialkylboranes wherein the alkyl groups have more than one carbon atom and carry at least one beta-hydrogen atom. For example, this reaction can be illustrated by the following equation:

R—CH=CH—R+>B—CH$_2$—CH$_3$⇌

CH$_2$=CH$_2$+>B—CHR—CH$_2$R

This reaction is quite slow and reversible and is the basis for the use of the trialkylboranes as isomerization catalysts.

More recently this reaction has been employed in the preparation of olefins from the alkyl substituents of the trialkylborane. However, since the reaction is slow and reversible it is not possible to obtain good yields unless the olefine is removed, for example, by distillation. If the olefin is not readily removed from the reactants, the problem of separation is greatly increased.

It has now been discovered that certain allenic compounds undergo isomerization, under conditions as hereinafter described, to provide novel olefinically unsaturated compositions. Accordingly, one or more of the following objects will be achieved by the practice of the instant invention.

It is an object of this invention to provide a novel process for the preparation of olefinic compounds. Another object of this invention is to provide a novel process for the preparation of olefins by the isomerization of allenic compounds. A further object is to provide a novel process for the preparation of olefinically unsaturated compounds having at least one double bond in the terminal position. Another object of this invention is to provide novel olefinically unsaturated compounds. A still further object of this invention is to provide a novel process for the preparation of derivatives of the novel olefinically unsaturated compounds. These and other objects will readily become apparent to those skilled in the art in the light of the teachings herein set forth.

As previously indicated, one aspect of the present invention relates to a novel process for the preparation of olefinic compounds and certain derivatives thereof. The process comprises heating certain allenic compounds, as hereinafter indicated, to a temperature sufficient to cause thermal isomerization of the allenic compound to the novel olefinic compounds of this invention.

The allenic compounds which undergo isomerization in accordance with the teachings of this invention are (a) olefinically unsaturated cycloaliphatic hydrocarbons containing from 9 to 12 ring carbon atoms, a pair of double bonds in the ring which are in an allenic position, i.e., —C=C=C—, and at least one other double bond in the ring which may or may not be part of an allenic group, and (b) the olefinically unsaturated aliphatic hydrocarbons containing from 5 to 12 carbon atoms preferably, in a straight chain, at least one pair of double bonds in the allenic position in such chain, and at least one other double bond which may or may not be part of an allenic group. In both (a) and (b) the allenic group and other unsaturation must not be separated by more than 4 carbon atoms.

In both instances the cycloaliphatic ring carbon atoms or aliphatic chain carbon atoms can contain alkyl substituents of from 1 to 6 carbon atoms. Upon isomerization under the conditions of the present invention novel olefinic compounds are formed wherein the allenic group is no longer present, and, in the case of the cycloaliphatic starting material, at least two terminal olefinic groups are formed.

Illustrative allenic compounds which can be employed in the process of this aspect of the invention include such compounds as 1,2,6-cyclononatriene, 1,2,6,7-cyclodecatetraene, 1,2,6-heptatriene, 1,2,6,7-octatetraene 2,7-dimethyl-2,3,5,6-octatetraene, 1,2,7,8-nonatetraene, and the like. Upon isomerization the aforementioned compositions provide 2,3-divinylcyclopentene, 2,3-divinyl-1,3-cyclohexadiene, 3-methylene - 1,5 - hexadiene, 3,4-dimethylene-1,5-hexadiene, 3,4-diisopropylidene cyclobutene, and 6,7-dimethylenebicyclo[3.2.0]heptane.

In contrast to the isomerization reactions of the above mentioned allenic compounds, it has been observed that in those instances wherein the cycloaliphatic hydrocarbon contained 9 ring carbon atoms and only one pair of double bonds both of which comprised the allenic group, the compound dimerized with a second molecule to provide a novel polycyclic composition. For example, 1,2-cyclononadiene, does not isomerize under the conditions of this invention, but dimerizes to give tricyclo-[9,7,0, $0^{2,10}$]-9,11-octadecadiene.

Additionally, it has been observed that allenic cycloaliphatic hydrocarbons containing less than 9 ring carbon atoms, or aliphatic hydrocarbons containing less than 5 carbon atoms, do not isomerize under the conditions of this invention. Moreover, it is critical to the present invention that the allenic group and other olefinic unsaturation, which itself may be a second allenic group, must not be separated by more than 4 carbon atoms.

As hereinbefore indicated the conversion of the allenic compounds to the novel composition of this invention is effected by an isomerization reaction. The isomerization is accomplished by passing the allenic compound in vaporous form through a reaction zone which is heated to a temperature of from about 150° C. to about 400° C. The temperature employed within this range will, of course, be dependent upon the particular allenic compound.

The process of the invention is conducted either at a reduced pressure, or in the presence of an inert gas, such as nitrogen, helium, or the like. When the process is effected at a reduced pressure, the pressure must be reduced to at least 10 millimeters of mercury, more preferably from about 1 to 10 millimeters of mercury.

The contact time necessary to effect the novel process of the invention need only be of such duration as to insure optimum conversion of the allenic compound to the olefin compound. Reaction times of a fraction of a second to several seconds are thoroughly practical. Shorter or longer periods can also be employed depending upon the temperature and the manner in which the process is conducted. However, the isomerization of allenic compounds is particularly rapid and the desired reaction products are obtained in a relatively short period.

Recovery of the isomerized product can be effected by condensing the vapors and isolating the reaction product according to known methods.

The process of the present invention is particularly applicable to continuous type operations. For instance, the reaction can be conducted in a continuous manner by means of a tubular or tank reactor. When operating a continuous process the allenic compound can be separately vaporized and brought to the proper temperature prior its passage through the reaction zone.

A second aspect of this invention is directed to the novel compositions which are obtained from the isomerization of the allenic compounds in accordance with the aforementioned process. The novel compositions encompassed by this embodiment of the invention are 2,3-divinylcyclopentene, 2,3-divinyl-1,3-cyclohexadiene, 3-methylene-1,5-hexadiene, 3,4 - dimethylene-1,5-hexadiene, 3,4-isopropylidene cyclobutene, and 6,7-dimethylenebicyclo-[3.2.0]-heptane.

These compositions are a useful class of compounds having significant and unobvious properties in various fields of application. Due to the unsaturated nature, certain of the novel compositions are particularly attractive for use as reactive polymerizable monomers. For example, the unsaturated compounds of this invention can be homopolymerized through the olefinic group, or copolymerized with other olefinically unsaturated organic compounds, e.g., vinyl monomers, through their olefinic groups, preferably in the presence of a peroxide catalyst to give linear solid polymeric products which have utility in the molding, laminating, and coating arts, e.g., manufacture of plastic toys which can be rigid or flexible, paperweights, ink-stands, and the like.

Among the vinyl monomers which can be polymerized with the novel compositions of this invention are those which contain a polymerizable olefinic bond. Illustrative vinyl monomers, include, for example, styrene, alkylstyrene, chlorostyrene, ethylstyrene, dimethylstyrene, isopropylstyrene, divinylbenzene, alkyl acrylate, alkl methacrylate, alkyl crotonate, methyl acrylate, ethyl acrylate, n-propylacrylate, n-butyl acrylate, methyl methacrylate, ethyl methacrylate, isopropyl methacrylate, n-amyl methacrylate, methyl crotonate, ethyl crotonate, n-propyl crotonate, t-butyl crotonate, 2-ethylhexyl crotonate, vinyl acetate, vinyl propionate, vinyl butyrate, vinyl valerate, and the like. Additional desirable monomeric ethylenically unsaturated compounds include, for instance, triallyl cyanaurate, diallyl phthalate, triallylamine, acrylonitrile, allyl acrylate, allyl methacrylate, allyl crotonate, allyl butyrate, allyl 2-ethylhexanoate, allyl benzoate, and the like.

The peroxide catalysts which can be employed include, for instance, benzoyl peroxide, methyl ethyl ketone peroxide, methyl isobutyl ketone peroxide, p-menthane hydroperoxide, t-butyl hydroperoxide, cumene hydroperoxide, acetyl peroxide, cyclohexanone peroxide, lauroyl peroxide, di-t-butyl peroxide, t-butyl perbenzoate, and the like.

The operative conditions, i.e., temperature and pressure are of the order employed in the vinyl-type polymerization arts, e.g., 75°–150° C.

Additionally, many of the unsaturated compositions of this invention can be contacted with an organic peracid to produce the corresponding vicinal-epoxides. Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracid, based on the total weight of peracid and inert organic vehicle is suitable; from about 20 to 40 weight percent of the peracid is preferred. The epoxidation reaction can be conducted at a temperature in the range of from about 0° C., and lower, to about 100° C., and higher, and preferably from about 20° C. to about 80° C. Substantial conversion of the monoethylenically unsaturated compound to the corresponding vicinal-epoxy compound is accomplished by employing at least one mol of peracid per mol of said monoethylenically unsaturated compound, e.g., from about 1.0 to about 10 mols of peracid per mol of said compound. In general, the epoxidation reaction is conducted for a period of time which is sufficient to introduce oxirane oxygen at the site in the olefinic reactant. Oftentimes, this reaction period is usually sufficient to essentially consume the quantity of peracid employed. Periodic analysis of samples of the reaction mixture to determine the quantity of peracid consumed during the epoxidation reaction can be readily performed by the operator by well-known techniques. At the termination of the epoxidation reaction, the unreacted ethylenically unsaturated precursor, acid by-product, inert vehicle, if employed, and the like, can be recovered from the reaction product mixture, for example, by distillation under reduced pressure. Further well-known procedures such as fractional distillation, and the like, can be used to purify the vicinal-epoxy cyclic or aliphatic product.

The novel and useful vicinal-epoxy polycyclic compounds can be homopolymerized or copolymerized with other vicinal-epoxy compounds or with other mono- or poly-epoxides, preferably in the presence of an epoxy polymerization catalyst such as the metal halide Lewis acids, e.g., boron trifluoride, under typical epoxy polymerization conditions, to give solid polymeric products which are useful in the coating, laminating and encapsulating arts.

Among the mono- and polyepoxides which are contemplated include, among others, -vinylcyclohexene dioxide, dicyclopentadiene dioxide, divinylbenzene dioxide, 3,4-epoxy - 6 - methylcyclohexylmethyl 3,4 - epoxy-6-methyl-cyclohexanecarboxylate, diethylene glycol bis(3,4-epoxy-cyclohexanecarboxylate), bis(2,3 - epoxycyclopentyl) ether, butadiene dioxide, phenyl glycidyl ether, 1,2-epoxydodecane, and the like.

In addition, the novel vicinal epoxy compounds with or without a polyepoxide such as those illustrated previously, can be reacted with an active organic hardener such as polycarboxylic acids, polycarboxylic acid anhydrides, polyfunctional amines, polyols, polythiols, polyisocyanates, polyacyl halides, and the like, preferably in the presence of a typical epoxy polymerization catalyst, $BF_3$-etherate, under conventional curing conditions, to produce solid epoxy resins which are useful in the laminating, coating, molding, and encapsulating arts.

In addition to the aforementioned uses of the novel olefinic compounds which are prepared in accordance with the teachings of this invention, many of the unsaturated compositions undergo a Diels-Alder reaction with dienophiles to form other new and useful products. For example, 2,3-divinylcyclopentene undergoes a Diels-Alder reaction with maleic anhydride in accordance with the equation:

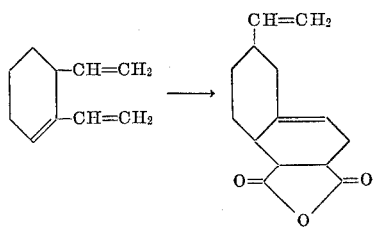

Moreover, 2,3-divinyl-1,3-cyclohexadiene readily forms a maleic anhydride adduct as follows:

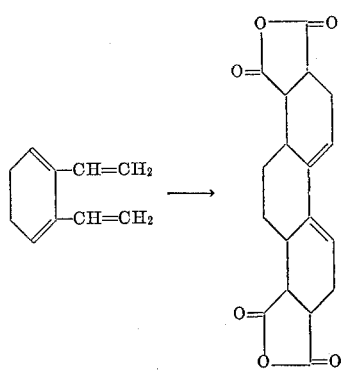

In a similar manner, the dimer of 1,2-cyclononadiene, i.e., tricyclo[9,7,0,0$^{2,10}$]-9,11-octadecadiene, reacts with two moles of maleic anhydride to give a novel Diels-Alder adduct as follows:

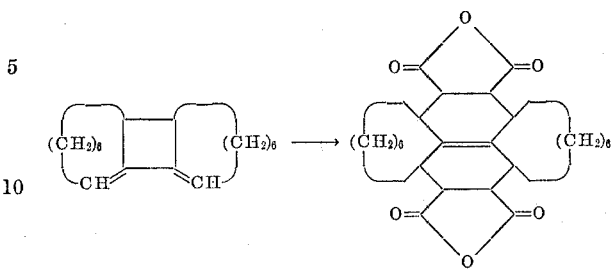

A wide variety of dienophiles can be employed with the compositions of this invention to provide other new and useful derivatives. For example, illustrative dienophiles which can be employed in this embodiment of the invention include, among others, allyl alcohol, acrolein, acrylonitrile, methyl acrylate, ethyl acrylate, n-propyl acrylate, methyl methacrylate, vinyl acetate, vinyl propionate, styrene, ethyl styrene, maleic acid, and the like.

The Diels-Alder adducts of this invention are a useful class of compositions and can be employed in the preparation of polymeric compositions to give solid, products which are useful in the coating, laminating, and encapsulating arts.

The starting materials employed in the instant invention are, for the most part, known compounds and reported in the literature. The synthesis of 1,2,6,7-octatetraene, and 2,7-dimethyl-2,3,5,6-octatetraene are prepared, as indicated in the examples, from known and readily available products.

In the following examples, the vapor phase experiments were carried out utilizing a 540 x 20 millimeter Pyrex tube having standard taper joints at either end. The tube was heated by wrapping two in heating tapes connected in series along its entire length, and was insulated with corrugated asbestos. Regulation of the temperature was achieved by means of a variable transformer connected to the leads of the tape. The temperature was measured by introducing a thermocouple through the bottom of the apparatus, between the tube and the insulation, into a small indentation in the wall of the tube. The thermocouple was connected to a Nester & Faust pyrometer which could measure temperatures up to 500° C.

In a typical experiment, the tube was packed with Pyrex glass wool and allowed to heat to the desired temperature. The compound to be reacted, (0.5 to 1 gram) was placed in a two or six milliliter flask which was fitted to the entrance of the reaction tube through splash barrier tube and a 75° elbow. At the exit end of the tube there was fitted a vacuum adapter connected to a taped two or six milliliter flask. When the desired temperature was reached the tube was evacuated for one minute to remove water vapor after which time the receiving flask was immersed in a Dry Ice acetone bath. The compound was vaporized until all of it had passed into the receiver. The vaporization times varied from one hour for the more volatile compounds, to 18 hours for higher boiling liquids, and solids. When all of the product had been collected, the rubber pressure tubing from the vacuum source was clamped off maintaining the system under vacuum. The tubing was disconnected from the vacuum source and connected to a nitrogen source. Nitrogen was then slowly introduced into the system. The Dry-Ice bath was removed and the receiver allowed to warm to room temperature. Samples were then removed for analysis and measurement of physical constants.

The following examples are illustrative:

EXAMPLE 1

Preparation of 2,7-dimethyl-2,3,5,6-octatetraene

Twenty nine grams of 2,2,2',2' - tetrabromo-3,3,3',3'-tetramethylbicyclopropyl, (0.06 mole), were suspended in 75 milliliters of absolute ether. Thereafter 75 milliliters of an ethereal methyl/lithium solution was added dropwise with stirring and cooling (−30–40° C.) over a period of three quarters of an hour. The mixture was stirred for an additional hour and water added. The ether layer was separated, washed until neutral and dried on sodium sulfate. Evaporation of the ether under vacuum gave a crystalline residue which upon recrystallization from methanol gave 7.9 grams of 2,7-dimethyl-2,3,5,6-octatetraene having a melting point of 46° C.

Upon analysis, the product was found to have the following composition:

*Analysis.*—Calculated for $C_{10}H_{14}$: C, 89.49; H, 10.51. Found: C, 89.62; H, 10.40.

The ultraviolet analysis in hexane at lambda maximum was found to be 213 m$\mu$, and the extinction coefficient at 213 m$\mu$ was 14,500.

EXAMPLE 2

Preparation of 1,2,6,7-octatetraene

In a manner similar to that employed in Example 1 1,2-bis(2,2-dibromocyclopropyl) ethane was suspended in absolute ether and the ethereal methyl/lithium solution added dropwise. After stirirng and separating of the ether layer as previously described, 1,2,6,7-octatetraene was obtained from the reaction mixture.

Carbon and hydrogen, infrared, and ultraviolet analyses were consistent with the assigned structure and confirmed the presence of allenic groups.

EXAMPLE 3

Preparation of 1,5-divinyl-cyclopentene 1,2,6-cyclononatriene, 5 grams, (0.042 mole) was vaporized and passed through the reaction tube which was maintained at a temperature of 235° C. and a pressure of 0.5 millimeters of mercury. Upon condensation and recovery of the reaction product, there was obtained 4.6 grams of a colorless liquid having a refractive index, $n_D^{25}$ 1.4960. This represented 92 percent of the theoretical yield. Upon analysis the product had the following composition:

*Analysis.*—Calculated for $C_9H_{12}$: C. 89.94; H, 10.06. Found: C, 89.82; H, 10.33.

Ultraviolet spectrum in n-heptane, indicated for lambda maximum 233 m$\mu$, with shoulders at 228 m$\mu$ and 240 m$\mu$. The extinction coefficient at 233 m$\mu$ was 20,900.

8.3 millimoles of 1.5-divinylcyclopentene was dissolved in 40 milliliters of glacial acetic acid and hydrogenated at room temperature over 1.5 grams of 5 percent platinum on powdered charcoal for 16 hours. The reaction mixture was filtered, the acetic acid distilled from the mixture, and the solution extracted with pentane. The pentane was removed by distillation leaving a residue which was shown by gas-liquid chromatography to consist of two components. By means of preparative gas chromatography there was isolated cis-1,2-diethylcyclopentane having a refractive index, $n_D^{23}$ of 1.4280, and a mixture of cis- and trans-1,2-diethylcyclopentane having a refractive index $n_D^{23}$ of 1.4316. The infrared spectrum and nuclear magnetic resonance measurements were consistent with the assigned structure.

EXAMPLE 4

Preparation of 2,3-divinyl-1,3-cyclohexadiene 1,2,6,7-cyclodecatetraene, 500 milligrams, was vaporized and passed through the reaction tube which was maintained at a temperature of 300° C. and a pressure of 0.5 millimeters of mercury. Upon condensation and recovery of the reaction product, there was obtained 370 milligrams of product having a refractive index, $n_D^{24}$ of 1.5441. This epresented 74 percent of the theoretical yield. Upon analysis the product had the following composition:

*Analysis.*—Calculated for $C_9H_{12}$: C, 89.94; H, 10.06. Found: C, 89.82; H, 10.33.

Ultraviolet spectrum in n-heptane, indicated 233 m$\mu$ for lambda maximum with shoulders at 228 m$\mu$ and 240 m$\mu$. The extinction coefficient at 208 m$\mu$ was 12,600, and at 231 m$\mu$, 10,800. Nuclear magnetic resonance data was consistent with the assigned structure.

500 milligrams of the 2,3-divinyl-1,3-cyclohexadiene was dissolved in 25 milliliters of pentane and hydrogenated at room temperature over 1.5 grams of 5 percent platinum on powdered charcoal for 16 hours. There was obtained a liquid which was shown by gas chromatography to contain three components. By preparative gas chromatography there was obtained a mixture of cis and trans diethylcyclohexane having a refractive index, $n_D^{25}$, of 1.4458, and a mixture of 1,2-diethyl cyclohexene and 2,3-diethyl-1,3-cyclohexadiene. The ultraviolet spectrum in n-heptane indicated 211 and 263 m$\mu$.

EXAMPLE 5

Preparation of 3,4-diisopropylidenylcyclobutene 2,7-dimethyl-2,3,5,6-octatetraene, 1 gram (7.5 millimoles) was vaporized and passed through the reaction tube which was maintained at a temperature of 300° C. and a pressure of 0.1 millimeters of mercury. Upon condensation and recovery of the reaction product, there was obtained a product having a melting point of 13–14° C. This represented 40 percent of the theoretical yield. Ultraviolet spectrum in n-heptane, indicated 221 and 265 m$\mu$. The extinction coefficient at 221 m$\mu$ was 37,900, and 5,700 at 265 m$\mu$.

400 milligrams of 2,4-diisopropylidene cyclobutene was hydrogenated in 25 ml. of pentane over 250 milligrams of 5 percent platinum on powdered charcoal as previously described. Filtration and evaporation of solvent afforded a liquid residue, which was separated, by preparative gas chromatography, into 1,2-diisopropylidenecyclobutane, having a refractive index, $n_D^{25}$ of 1.5026; and 1,2-diisopropylcyclobutane; having a refractive index, $n_D^{25}$ of 1.4480. Infrared and ultraviolet spectra were consistent with the assigned structures.

EXAMPLE 6

Preparation of 3-methylene-1,5-hexadiene 1,2,6-heptatriene, 180 milligrams, was vaporized and passed through the reaction tube which was maintained at a temperature of 362° C. and a pressure of 10 millimeters of mercury. Upon condensation and recovery of the reaction product, there was obtained 3-methylene-1,5-hexadiene having a refractive index, $n_D^{23}$, of 1.4540 and which represented 90 percent of the theoretical yield. Upon analysis, the product had the following composition:

*Analysis.*—Calculated for $C_7H_{10}$: C, 89.29; H, 10.71. Found: C, 89.11; H, 10.85.

Ultraviolet spectrum in n-heptane indicated 223 m$\mu$ for lambda maximum with shoulders at 210 and 230 m$\mu$. The extinction coefficient at 223 m$\mu$ was 20,400; at 210 m$\mu$ was 15,300; and at 230 m$\mu$ was 17,900.

EXAMPLE 7

Preparation of 3,4-dimethylene-1,5-hexadiene 1,2,6,7-octatetraene, 780 milligrams, was vaporized and passed through the reaction tube which was maintained at a temperature of 300–310° C. and a pressure of 0.2 millimeters of mercury. Upon condensation and recovery of the reaction product there was obtained 3,4-dimethylene-1,5-hexadiene in 50 percent of the theoretical yield. Ultraviolet spectrum in n-heptane indicated 216 m$\mu$ for lambda maximum. The extinction cofficient was 34,000 at 216 m$\mu$. Nuclear magnetic resonance data was consistent with the assigned structure.

EXAMPLE 8

Preparation of 6,7-dimethylenebicyclo[3.2.0]heptane 1,2,7,8-nonatetraene, 900 milligrams, was vaporized and passed through the reaction tube which was maintained at a temperature of 390° C. and a pressure of 0.025 millimeters of mercury. Upon condensation and recovery of the reaction product, there was obtained 6,7-dimethylenebicyclo[3.2.0]heptane having a refractive index, $n_D^{24}$ of 1.4997 and which represented 90 percent of the theoretical yield. The ultraviolet spectrum indicated 247 mµ for lambda maximum with shoulders at 238 and 257 mµ. The extinction coefficient at 247 mµ was 11,500; at 238 mµ, 9,150; and at 257 mµ 8,560. Nuclear magnetic resonance data was consistent with the assigned structure.

EXAMPLE 9

Preparation of maleic anhydride adduct of 1,5-divinylcyclopentene

To a solution of 2.5 grams of powdered, resublimed maleic anhydride in 10 milliliters of dry benzene was added 3.0 grams of 1,5-divinylcyclopentene. The reaction mixture became warm. After standing for 75 minutes the benzene was evaporated and the residue recrystallized from cyclohexane. There was obtained an adduct having a melting point of 91–92° C. and the following analysis:

*Analysis.*—Calculated for $C_{13}H_{14}O_3$: C, 71.54; H, 6.47. Found: C, 71.84; H, 6.60.

EXAMPLE 10

Dimerization of 1,2-cyclononadiene 1,2-cyclononadiene, 7.36 grams, (0.06 moles) was sealed in an ampoule under nitrogen and immersed in an oil bath maintained at 130–140° C. for 18 hours. The tube was allowed to cool and the contents chromatographed through 284 grams of alumina, neutral activity grade 1. The column was eluted with pentane. After evaporation of solvent and recrystallization from n-propanol, there was obtained 4.0 grams of tricyclo[9,7,0,0$^{2,10}$]octadeca-9,11-diene having a melting point of 80–84° C. This represented 54.7 percent of the theoretical yield. The ultraviolet spectrum in n-heptane indicated 258 mµ for lambda maximum with shoulders at 250 and 269 mµ. The extinction coefficient at 250 mµ was 12,200; at 258 mµ, 15,800; and at 269 mµ 11,800. Nuclear magnetic resonance data was consistent with the assigned structure.

5.3 grams of tricyclo[9,7,0,0$^{2,10}$]octadeca-9,11-diene, (0.0215 mole) was dissolved in 100 milliliters of hexane and hydrogenated for 16 hours at 50° C. over 1.5 grams of 5 percent platinum on powdered charcoal. Filtration and evaporation of the solvent afforded 5.3 grams of a liquid residue. Upon cooling in the freezer the compound crystallized out and thereafter was recrystallized from absolute ethanol. The product had a melting point of 58–59° C. Infrared absorption showed the absence of olefinic bonds. Upon analysis the product had the following composition:

*Analysis.*—Calculated for $C_{18}H_{32}$: C, 87.02; H, 12.98. Found: C, 87.34; H, 12.78.

EXAMPLE 11

Preparation of maleic anhydride adduct of tricyclo [9,7,0,0$^{2,10}$]octadeca-9,11-diene Tricyclo[9,7,0,0$^{2,10}$]octa-9,11-diene was dissolved in 10 milliliters of dry xylene containing 2.4 grams of resublimed maleic anhydride. The solution was refluxed for two hours during which time a white solid separated out. The solution was cooled and filtered, and the residue recrystallized from benzene; there was obtained 2.3 grams of the adduct having a melting point of 312–313° C. Upon analysis the product had the following composition:

*Analysis.*—Calculated for $C_{26}H_{32}O_6$: C, 70.89; H, 7.32. Found: C, 70.82; H, 7.27.

Although the invention has been illustrated by the preceding examples it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A process for the isomerization of olefinically unsaturated aliphatic hydrocarbons containing from 5 to 12 carbons in a straight chain; said hydrocarbons containing one pair of adjacent double bonds and at least one other double bond which is no more than 4 carbon atoms removed from said pair of adjacent double bonds, which process comprises heating an olefinically unsaturated aliphatic hydrocarbon as defined above in the vaporous state to a temperature of from about 150° to about 400° C., and thereafter recovering the isomerized product which is free of adjacent double bonds.

2. The process of claim 1 wherein said isomerization is conducted at a pressure of less than 10 millimeters of mercury.

3. The process of claim 1 wherein said isomerization is conducted in an inert atmosphere.

4. A process for the isomerization of 1,2,6-heptatriene which comprises heating said 1,2,6-heptatriene in the vaporous state to a temperature of from about 150° to about 400° C. and thereafter recovering 3-methylene-1,5-hexadiene.

5. A process for the isomerization of 1,2,6,7-octatetraene which comprises heating said 1,2,6,7-octatetraene in the vaporous state to a temperature of from about 150° to about 400° C., and thereafter recovering 3,4-dimethylene-1,5-hexadiene.

6. 3-methylene-1,5-hexadiene.

References Cited

UNITED STATES PATENTS

| 2,995,543 | 8/1961 | Williams et al. | 260—682.1 |
| 3,264,366 | 8/1966 | Aufdermarsh | 260—683.15 |
| 3,333,012 | 7/1967 | Skattebol et al. | 260—666 |

OTHER REFERENCES

W. Von E. Doering et al. I Tetrahedron, vol. 18, pp. 67–74, 1962.

W. Von E. Doering et al. II Tetrahedron, vol. 19, pp. 715–737, 1963.

Emmanud Vogel Angew Chem. 75(22) p. 1103, November 1963.

J. L. Charlton, et al. Tetrahedron Letters 1965 (51), 4679–83 (Eng).

DELBERT E. GANTZ, Primary Examiner

J. M. NELSON, Assistant Examiner

U.S. Cl. X.R.

260—683.2